(No Model.)  S. STANBRIDGE.  6 Sheets—Sheet 1.
MACHINE FOR EXTRACTING AND CLEANING VEGETABLE FIBERS.
No. 556,032.  Patented Mar. 10, 1896.

(No Model.) 6 Sheets—Sheet 2.
S. STANBRIDGE.
MACHINE FOR EXTRACTING AND CLEANING VEGETABLE FIBERS.
No. 556,032. Patented Mar. 10, 1896.

(No Model.) 6 Sheets—Sheet 3.

S. STANBRIDGE.
MACHINE FOR EXTRACTING AND CLEANING VEGETABLE FIBERS.

No. 556,032. Patented Mar. 10, 1896.

Witnesses:
C. B. Eaton
H. M. Skinner

Inventor
Samuel Stanbridge
by R. Mitchell
Attorney (No Model.) 6 Sheets—Sheet 6.

S. STANBRIDGE.
MACHINE FOR EXTRACTING AND CLEANING VEGETABLE FIBERS.

No. 556,032. Patented Mar. 10, 1896.

Witnesses:
C. B. Eaton
H. M. Skinner

Inventor
Samuel Stanbridge
by R. Mitchell
Attorney.

UNITED STATES PATENT OFFICE.

SAMUEL STANBRIDGE, OF LONDON, ENGLAND, ASSIGNOR OF ONE-HALF TO SYDNEY SHORTER, OF SAME PLACE.

MACHINE FOR EXTRACTING AND CLEANING VEGETABLE FIBERS.

SPECIFICATION forming part of Letters Patent No. 556,032, dated March 10, 1896.

Application filed November 26, 1895. Serial No. 570,230. (No model.)

*To all whom it may concern:*

Be it known that I, SAMUEL STANBRIDGE, engineer, a subject of the Queen of Great Britain, residing at 67 Seaford Road, South Tottenham, London, in the county of Middlesex, England, have invented new and useful Improvements in Machines for Extracting and Cleaning Vegetable Fibers, of which the following is a specification.

My invention relates to machines for the extraction and cleaning of vegetable fibers and to the preparation of the same for industrial uses, and has for its chief object the provision of an apparatus for this purpose which shall be more simple in construction, more rapid and automatic in its operation and more efficient in practical use than those heretofore devised.

Figure 1:
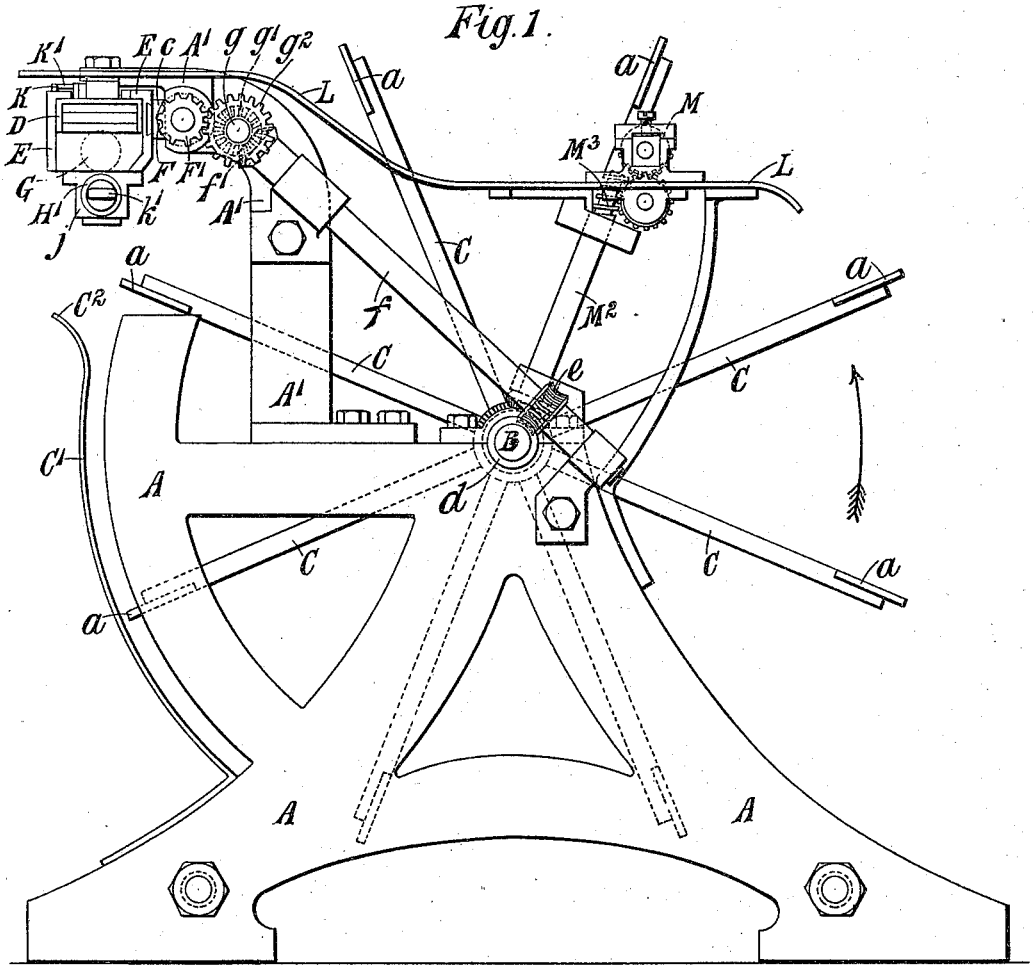
Figure 2:
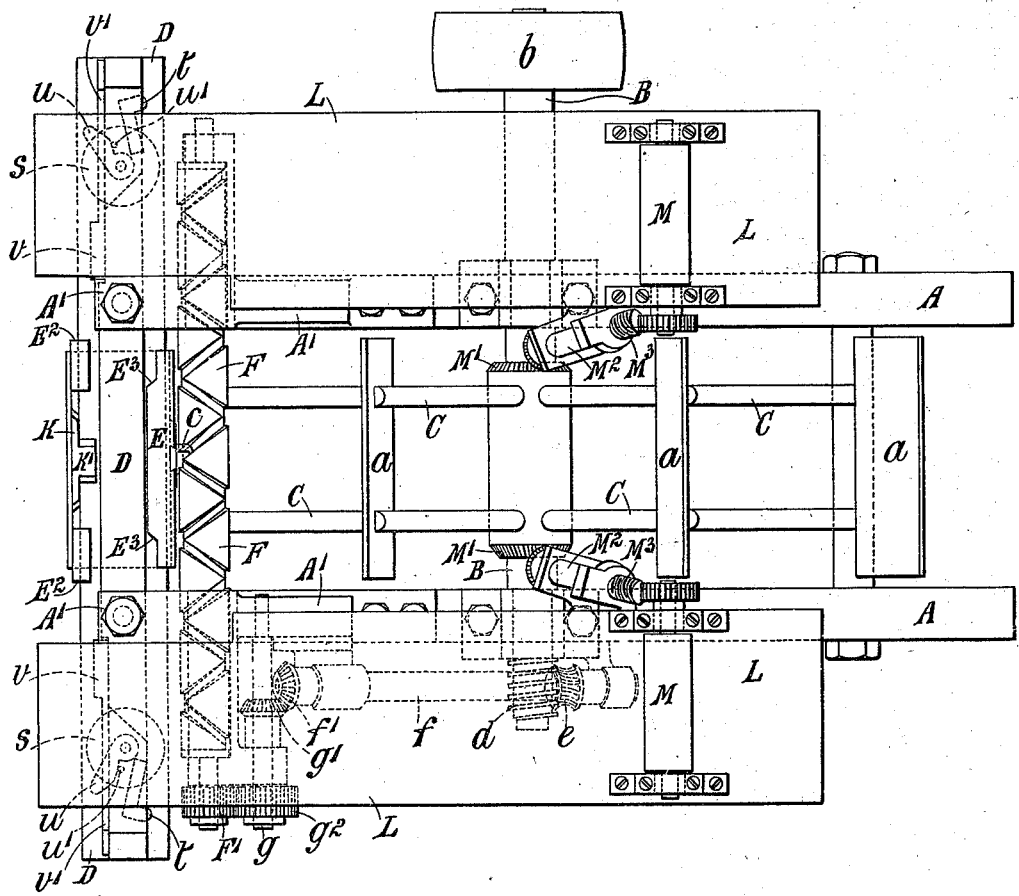
Figure 3:
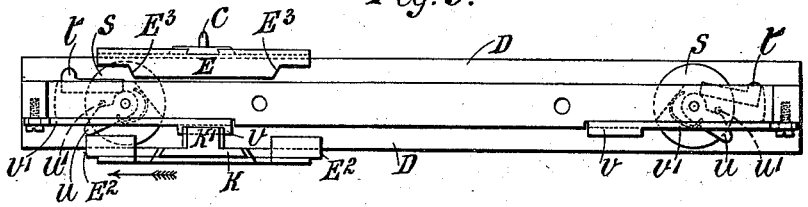
Figure 5:
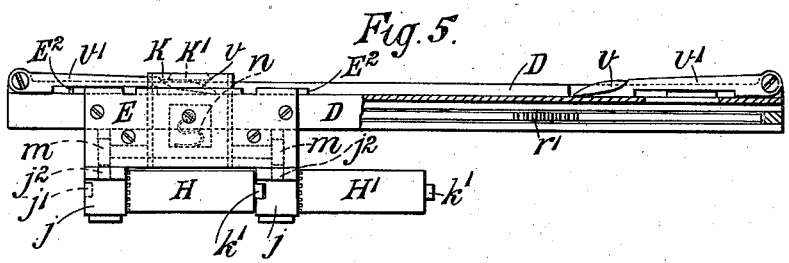
Figure 4:
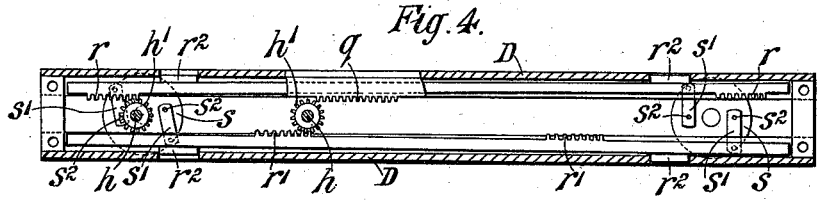
Figure 6:
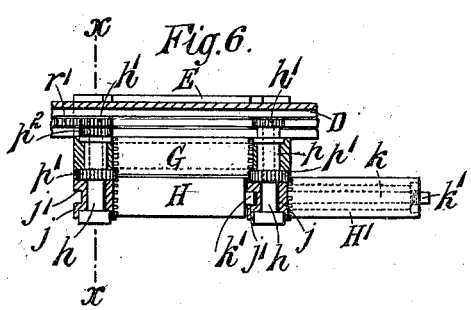
Figure 7:
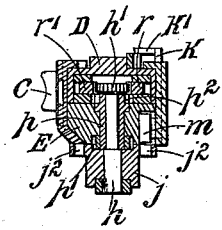
Figure 8:
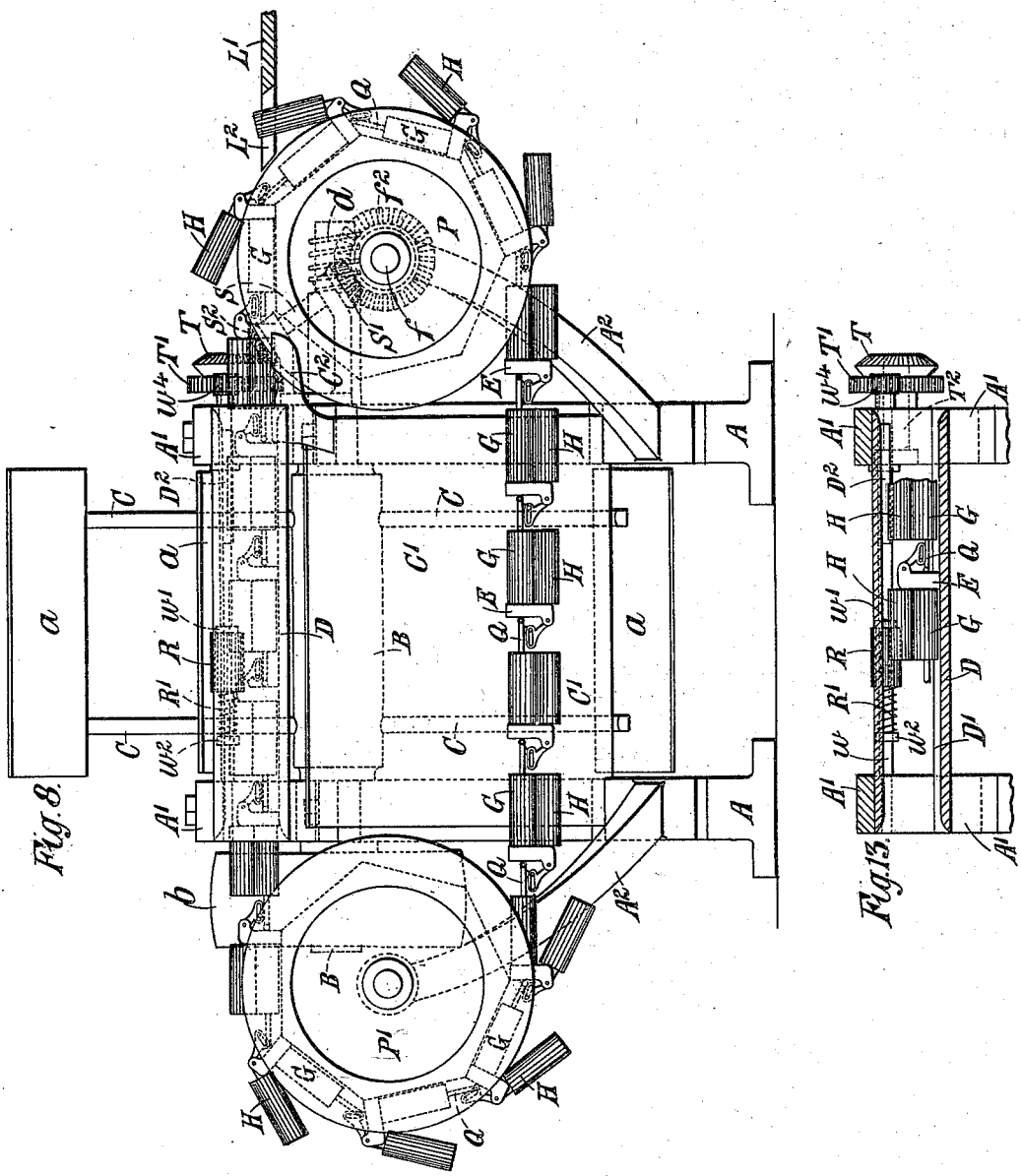
Figure 9:
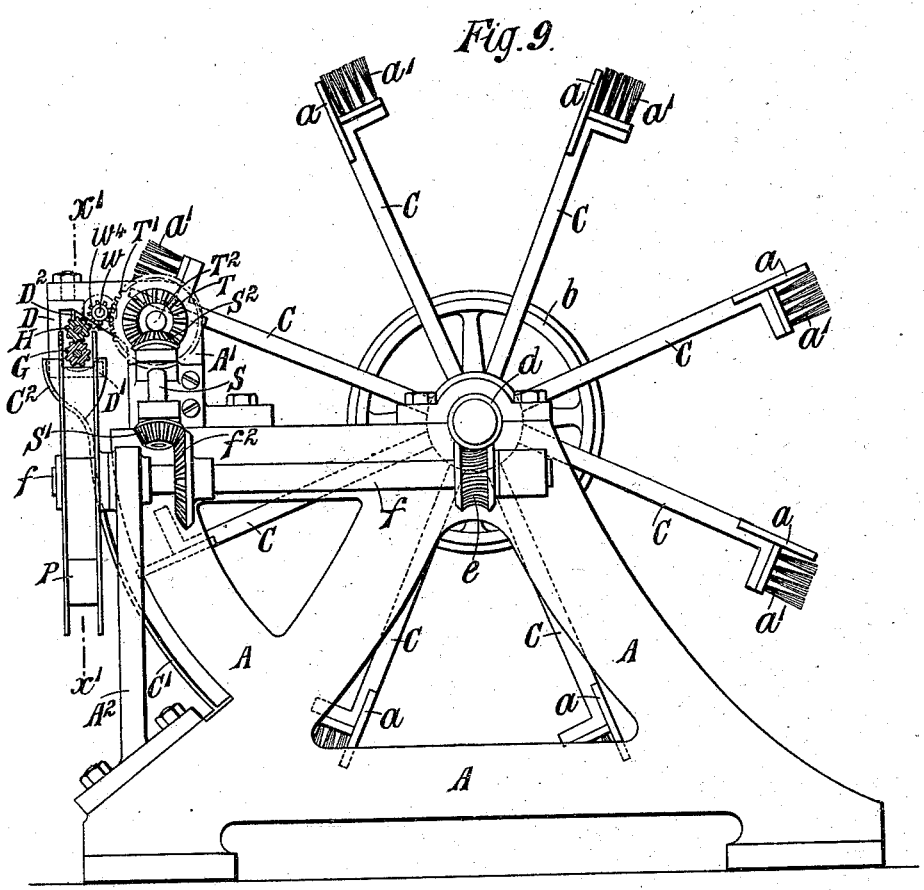
Figure 10:
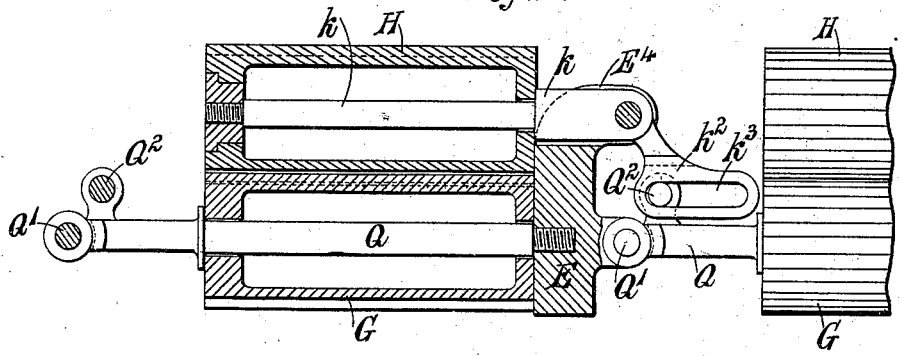
Figure 11:
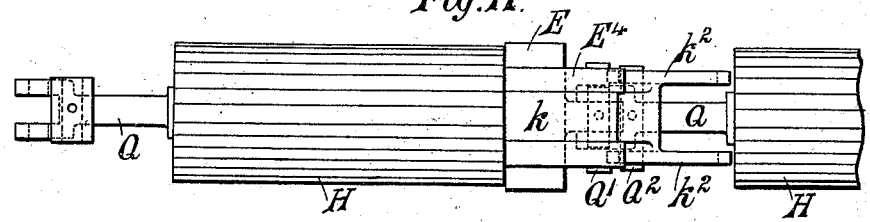
Figure 12:
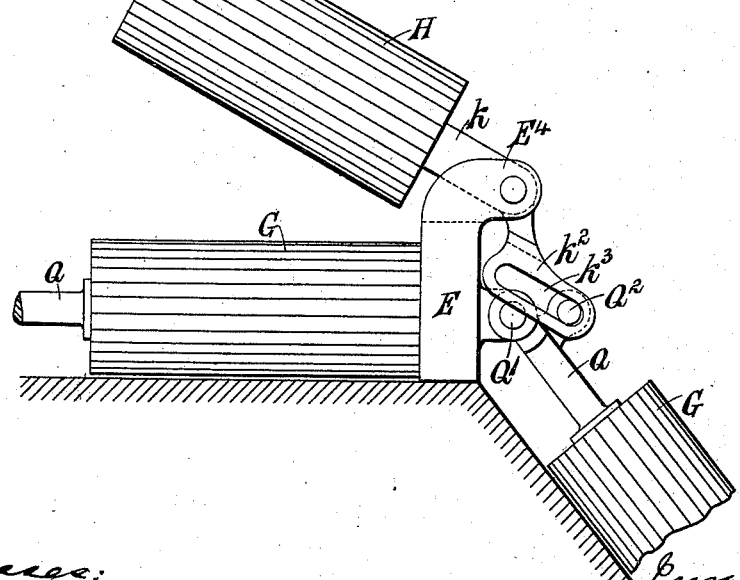

In the accompanying drawings, Figure 1 is a side elevation, and Fig. 2 a plan, showing one form of my improved apparatus. Fig. 3 is a plan of the slide-box detached, showing the sliding frame or carriage in the position which it occupies when commencing to turn the swinging rollers hereinafter described. Fig. 4 is an under side view of the said slide-box, showing the internal toothed racks. Fig. 5 is a front elevation of the said slide-box and sliding carriage. Fig. 6 is a longitudinal central section, and Fig. 7 a transverse section on the line $x\ x$, Fig. 6, showing the sliding carriage. Fig. 8 is a front elevation, and Fig. 9 a side elevation, showing another form or modification of my improved apparatus. Fig. 10 is a side elevation, partly in longitudinal central section, and Fig. 11 a plan, both drawn to an enlarged scale, illustrating details of construction. Fig. 12 is a side elevation showing the parts in a different position. Fig. 13 is a section on the line $x'\ x'$, Fig. 9, showing the interior of the slide-box.

Like letters indicate corresponding parts throughout the drawings.

In the apparatus hitherto devised for this purpose it has been necessary, in order to treat the whole of the leaves or other parts of the plants containing the fibers, either to effect the cleaning in two operations by means of a single cleaning or beating wheel, the leaves or the like being in this case shifted by hand between the two operations, or to employ two cleaning or beating wheels, the leaves or the like being subjected to the action of these wheels successively, so that the portion of the leaves or the like which cannot be cleaned in the first operation will be cleaned in the succeeding operation.

My invention comprises a machine for the treatment of the whole of the leaves or other fibrous materials by means of a single beating or cleaning wheel in one operation, this result being attained by automatically altering the position of the leaves or other materials relatively to their supporting devices while they are being acted upon by the beaters or the like. A considerable economy is thus effected in respect of both time and hand-labor.

My said invention also comprises means whereby the leaves or other materials are automatically seized by the feed mechanism of the machine, brought into and held in position to be operated upon by the beaters or the like and then released. For this purpose I employ rollers which are so arranged that they close together and seize between them the material to be treated, then carry the said material across the path of the beaters, and then open out to release the cleaned fibers. For the purpose of changing the position of the material relatively to these rollers, so as to permit the cleaning of the part of the material previously held between them, the said rollers are rotated about their axes after they have been moved through a predetermined distance across the machine, the part of the material previously held between the rollers being thus brought into position to be acted upon by the beaters.

My said invention also comprises other improvements hereinafter described.

Referring to the drawings, A is the frame of the machine.

B is the main shaft carrying the drum or framework C, on which are mounted the beaters $a$ for cleaning the fibers. This shaft B is driven by belting through the pulley $b$ or in any other suitable manner from a steam-engine or other convenient source of power. Suitable brushes or the like may, if desired, be provided on the drum or frame C in addition to the beaters a, according to the particular class of vegetable fibrous material to be operated upon. In front of the beaters a is fixed a curved guard, shield, or scutching-board C', against which the vegetable material is supported while being acted upon by the beaters.

D is a slide-box which is mounted on brackets A' attached to the frame A, and which is so arranged that its guiding-surfaces shall lie parallel to the operative edges of the beaters a, brushes, or the like.

A frame or carriage E is arranged to be moved backward and forward on the slide-box D by means of a leading-screw F, having two threads cut thereon, one of the said threads being right-handed and the other left-handed. The helical grooves of this screw pass one into the other at each end of the screw by means of a suitable curved path, so that the said screw serves to continuously reciprocate the carriage E along the slide-box D by means of a segmental nut c pivotally secured to the said carriage E.

Rotary motion is imparted to the screw F from the main shaft B by means of a worm d on the said shaft geared with a worm-wheel e on a shaft f, mounted in suitable bearings on the frame A. The shaft f drives by means of bevel-gearing f' g' a third shaft g, from which motion is communicated to the leading-screw F through gear-wheels $g^2$ F'. The leading-screw F is thus rotated continuously in one direction and causes the carriage E to move backward and forward along the slide-box D as the segmental nut c traverses either the right-handed or left-handed screw-threads on the leading-screw F.

It is obvious that, if desired, other suitable mechanism may be employed for automatically reciprocating the sliding carriage.

In the carriage E is mounted a roller G adapted to be intermittently rotated, as hereinafter described. At each end of the said carriage is pivotally mounted a vertical shaft h, provided at its upper end with a gear-wheel h' and at its lower end with a piece j, in which is rigidly secured an arbor k. Rollers H H' are fitted to rotate on the arbors k. When either roller H or H' is in its operative position, it is parallel to and in contact with the roller G, and the leaves or other fibrous materials to be treated are held between these contiguous rollers, the other or inoperative roller extending outward in line with the operative roller, as shown at H' in Figs. 5 and 6. Grooves or slots j' are formed in the pieces j at the opposite side to that at which the arbors k are attached, these grooves being adapted to receive tenons k' provided at the free ends of the arbors k, so that when, for example, the roller H is in contact with the roller G the tenon k' at the end of its arbor k rests in the slot j' in the piece j, on which the roller H' is mounted, as shown in Figs. 5 and 6, the inoperative roller H' being meanwhile extended beneath the slide-box D in a line with the operative roller H. The arrangement is similar when the roller H' is in contact with the roller G and the roller H the inoperative one. By thus supporting the free ends of the arbors k any undue strain thereon or on the shafts h is prevented when the rollers H H' are supporting the leaves or other vegetable material to be cleaned, as hereinafter described. Other suitable devices may, however, be employed for this purpose. For example, the free ends of the arbors carrying the swinging rollers may slide on suitable guideways.

In order to lock the pieces j carrying the rollers H H' and thus secure the said rollers in their operative or inoperative position, as the case may be, and to release them at the proper times a slide K is provided working in guides on the carriage E, which slide carries bolts m sliding in suitable guides or recesses in the body of the carriage E and adapted to enter holes $j^2$ in opposite sides of the pieces j, so that the said pieces and the rollers H H' mounted thereon can be locked in either of two positions at an angle of one hundred and eighty degrees to one another. The slide K is provided at its upper end with an arm or projection K' whereby it may be raised at the proper times, as hereinafter described, to release the pieces j, it being normally held in its lowermost position by means of the spring n.

The rollers G, H and H' are adapted to be simultaneously turned about their axes, so as to alter the position of the leaves or other fibrous materials with respect to the beaters, as follows, viz: In the sliding carriage E are provided sleeves p, turning freely on the shafts h. These sleeves have gear-wheels p' rigidly secured thereon and geared with similar wheels formed at each end of the roller G and at the inner end of each of the rollers H H'. The teeth on the gear-wheels p' are made of such width that each of the said gear-wheels engages with both the gear-wheel formed at the end of the roller G nearest thereto and the gear-wheel formed at the end of the swinging roller H or H' adjacent to it, as the case may be.

Motion is imparted to the intergeared system of rollers G H H', as hereinafter described, through a gear-wheel $p^2$, provided at the upper end of one of the sleeves p. In the machine shown it is attached to the sleeve driving the roller H. It is obvious that instead of the gear-wheels p' pairs of bevel or miter wheels engaging with similar wheels on the ends of the rollers may be employed if found necessary.

The several devices above described are operated by the motion of the sliding carriage E relatively to the slide-box D in the manner hereinafter set forth, viz:

Considering first the rotation of the rollers G H H' about their own axes, the gear-wheel $p^2$ on the sleeve p projects up into the interior of the slide-box D and engages when the carriage E is in the middle of the length of the slide-box with a rack q, secured to the said slide-box, this rack being of sufficient length to turn the pair of rollers in which the leaf or the like is held through such a number of turns as to bring all parts of the said leaf under the action of the beaters. This turning of the rollers takes place in different directions, according to the direction in which the sliding carriage is traveling.

The swinging rollers H H' are alternately brought into their operative position with respect to the roller G at or near each end of the travel of the carriage E by means of the gear-wheels $h'$ on the shafts $h$. These gear-wheels extend up into the interior of the slide-box D higher than the gear-wheel $p^2$ and are operated by means of two pairs of racks $r\ r'$, one pair being arranged at each end of the slide-box D. The said racks are mounted in suitable ways in the interior of the slide-box D and are provided with guides $r^2$, moving in apertures formed in the walls of the said slide-box. The racks $r\ r'$ at each end of the slide-box D are connected by means of links $s'$ to pins $s^2$ on the under side of a disk $s$, pivotally mounted in the slide-box D. On the upper side of each of the disks $s$ is provided a projection $t$, rigidly fixed thereto, and a spring-pawl $u$, the motion of which is limited in one direction by means of a stop $u'$.

The spring-pawl $u$ is operated by the leading end $E^2$ of the carriage E as it approaches the end of its travel, so as to turn the disk $s$ and thus bring the racks $r\ r'$ at that end of the slide-box D into engagement with the gear-wheels $h'$. When the rollers H H' have been interchanged in position beneath the roller G, a projection $E^3$ on the other side of the carriage E engages the arm or projection $t$ to turn the disk $s$ back to its original position and retract the racks $r\ r'$, so as to permit the passage of the gear-wheels $h'$ as the carriage E commences a fresh stroke or passage along the slide-box D. For this purpose the projection $E^2$ is made of such length as to pass the spring-pawl $u$ before the projection $E^3$ comes into contact with the arm $t$. As the carriage E moves on the said fresh stroke, the inner edge of the projection $E^2$ again engages the spring-pawl $u$, but in this case the spring thereof enables the said pawl to yield and return to its normal position after the passage of the said projection $E^2$.

The slide K is raised to release the swinging rollers H H' during their motions above described by means of an inclined projection $v$ formed on a rod $v'$ pivotally mounted on the upper surface of the slide-box D. This projection is so formed as to engage with the under side of the arm K' and raise the said slide K as the carriage E approaches the end of the slide-box D, as shown in Fig. 3, but when the carriage E moves from the end of the said slide-box the arm K' passes under the projection $v$, raising the pivoted bar $v'$.

L L are tables or rests along which the leaves or other material are fed and supported, as hereinafter described, the said tables being provided with crushing-rollers M driven from the main shaft B through the bevel-gearing M', shafts $M^2$, and worm-gearing $M^3$, or in any other suitable manner.

The operation of my improved apparatus is as follows: The leaves or other vegetable materials to be treated are first passed through the crushing-rollers M, and then laid over the ends of the tables L, so that about half of their length hangs down in front of the slide-box D. In the movement of the sliding carriage E, as indicated by the arrow in Fig. 3, the roller G is moved into position behind the overhanging leaves and the rollers H H' are swung about their pivots $h$ in opposite directions, so that the said leaves are seized or gripped between the roller H' and the roller G, while the roller H carries away from the roller G the leaves just cleaned, which leaves are then removed by an attendant, or automatically by means of a suitable taking-off or receiving device. The leaves seized by the roller H' are then caused, by the movement of the carriage E in the reverse direction, to pass between the beater-drum C and the scutching-board C', where the pulpy part of the leaves is removed, a stream of water being preferably allowed to pass over the same. The said scutching-board is provided with guides or ways $C^2$ for conducting the free ends or parts of the leaves, after the said leaves have been seized by the rollers, toward the beater-drum.

As the leaves pass in front of the beaters $a$, the rollers G H' are turned about their horizontal axes by means of the rack $q$ sufficiently to bring in front of the beaters the uncleaned portions of the leaf—that is to say, the portions thereof which could not be reached by the beaters. When the leaves have thus been moved across the machine, they are discharged by the swinging inward of the roller H', the roller H at the same time seizing a fresh quantity of leaves. The sliding carriage E then travels back across the machine and the above-described operations are repeated automatically, an attendant keeping the tables or rests supplied with fresh leaves as required.

By imparting a transverse movement to the leaves or other materials while being acted upon by the beaters or the like I cause the fibers thereof to rotate or twist slightly about their own axes, and thus insure that the whole of their exterior surface shall be thoroughly cleaned or freed from the pulpy portions.

In some cases I find it advantageous, instead of reversing the direction of motion of the carriage at each end of its travel, to provide a circular or endless slide box or bar and to cause a series of carriages to travel around it continuously in one direction in any suitable manner. In this case the mechanism for retracting the racks may be dispensed with, since the carriages do not require to travel back past them, as above described. Moreover, only one swinging roller will be necessary for each stationary roller.

To prevent turning of the rollers G H H' when the spur-wheel $p^2$ is not in contact with the rack $q$, I sometimes provide well-known and suitable means, so as to enable the said rollers to resist the drag of the beaters or the like on the leaf.

In Figs. 8 to 13 I have shown a modification of my said invention in which the slide-box D is open on the inner side and in which a series of carriages E are employed, the said carriages being connected, as hereinafter described, so as to form a continuous chain. This chain is supported on wheels P P' mounted on brackets $A^2$ and is fed through the slide-box D by means of the wheel P, which is driven from the main shaft B through the worm $d$, worm-wheel $e$ and shaft $f$. The arbor Q of each stationary roller G is rigidly secured at one end in the corresponding carriage E, and its other end is pivotally attached at Q' to one side of the adjacent carriage E. The swinging rollers H are corrugated, as are also the rollers G, and turn on arbors $k$ pivotally mounted in projections $E^4$ on the carriages E. Each arbor $k$ is provided with a forked tailpiece $k^2$ having slots $k^3$, through which extends a pin $Q^2$ on the arbor Q of the roller G of the adjacent pair of rollers. The distance between the pin $Q^2$ and the pivot Q' and the length of the tailpiece $k^2$ are so arranged, as shown, for example, in Figs. 10 to 12, that the swinging rollers H will be swung out or opened as the chain bends in passing around the chain-wheels P P', and when the chain is straightened out the swinging rollers H are pressed closely against the rollers G by the pressure of the pins $Q^2$ on the tailpieces $k^3$, as shown in Fig. 10.

For the purpose of turning the rollers G H about their axes, as they pass through the slide-box D in front of the beaters, I provide a gear-wheel R, adapted to gear with the teeth or corrugations on the rollers H, this gear-wheel being mounted on a shaft $w$, so as to be free to slide longitudinally thereon between two stops $w'$ $w^2$. The said gear-wheel is normally held against the stop $w'$ by means of a spiral spring R' and is prevented from turning relatively to the shaft $w$ by means of a feather working in a slot or by other well-known or suitable means. Rotary motion is imparted to the shaft $w$ from the shaft $f$ through the bevel-wheels $f^2$ S', shaft S, bevel-wheels $S^2$ T, and gear-wheels T' $w^4$, the bevel-wheel T and gear-wheel T' being connected and turning on a stud $T^2$. As the rollers H are carried along the slide-box D, they come into engagement with the gear-wheel R and are turned thereby as required. Should it happen, however, that the teeth on the gear-wheel R do not register with those on the roller H, the wheel R will yield or slide longitudinally, compressing the spring R' until the wheel R has been turned sufficiently to bring the teeth of the one into alignment with the spaces of the other. Damage to the apparatus is thus prevented. The leaves or other materials to be cleaned are in this case laid on a feeding-table L', which is provided with a slot or aperture $L^2$, through which the rollers H pass before they close against the rollers G and enter the slide-box D. As the ends of the leaves fall down they are guided into position over the lower edge D' of the slide-box D by means of a guiding-horn $C^2$, formed on the end or edge of the scutching board or table C', so as to be brought in front of the beaters $a$ and brushes $a'$. After entering the slide-box D and before they reach the gear-wheel R the rollers G H are prevented from turning by means of a spline or feather $D^2$, which enters one of the spaces between the teeth on the roller H and prevents the same from turning as the beaters act on the leaves or other materials to be cleaned. If desired, this feather may be allowed to slide against the pressure of a suitable spring, similarly to the wheel R. The cleaned fibers, after being released at the other end of the slide-box D by the opening of the rollers H on the wheel P', are carried over the said wheel and fall out into a truck or other receptacle placed beneath the said wheel to receive them.

If desired, the mechanism for driving the shaft $w$, the shaft $f$, the leading-screw F, and other parts may be operated separately, as may also the devices for taking off the cleaned fibers from the swinging rollers, or they may be operated in any other suitable manner. The rollers may be plain, toothed, polygonal, or of other suitable form.

It is, moreover, obvious that my improved apparatus may be somewhat further modified without departing from the nature of my said invention.

What I claim is—

1. In a machine for the extraction and cleaning of vegetable fiber, the combination, with a beating or cleaning wheel, of rollers for supporting the material to be treated operating mechanism whereby said rollers are moved across the path of the beaters and caused to close together at one side of the machine to grasp the said material and to open out at the other side of the machine to release the cleaned fibers, and gearing for connecting said rollers with the driving-shaft, whereby said rollers are turned about their axes after they have moved a predetermined distance across the machine, to permit the cleaning of that part of the material previously held between them.

2. In a machine for the purposes above specified, the combination, with the feeding-table and the beating-wheel, of a carriage-operating mechanism whereby said carriage is moved transversely to said wheel, swinging or pivoted rollers attached to said carriage, and operating mechanism whereby, during the movement of the carriage, said rollers are closed together to take the materials off the feeding-table, moved across the machine to present the same to the action of the beaters, and then opened out to release said materials after they have been acted upon by the said beaters, substantially as hereinbefore described.

3. A machine for the purposes above specified, comprising a beating or cleaning wheel, a slide-box or slide-bar mounted on the frame of the machine in front of said wheel, one or more sets of rollers, means substantially such as above described for moving said rollers along the said slide-box or slide-bar, means substantially such as above described for automatically operating the said rollers to take in and to release the material to be cleaned, and toothed gearing whereby said rollers are turned about their axes during their movement across the machine, as and for the purposes specified.

4. The combination, in a machine for the purposes above specified, of a beating or cleaning wheel, a slide-box or slide-bar mounted on the frame of the machine, a series of sliding frames forming an endless chain, sets of rollers mounted on said frames, chain-wheels for moving said chain along said slide-box or slide-bar, link mechanism whereby said rollers are opened and closed as they enter and leave said slide-box or slide-bar, and toothed gearing whereby said rollers are turned about their axes while moving along said slide-box or slide-bar, substantially as and for the purposes hereinbefore described.

5. The combination, in a machine for the purposes above specified, of a beating or cleaning wheel, a slide-box or slide-bar, carrying-rollers, a gear-wheel rotatably mounted in said slide-box or slide-bar, so as to engage said carrying-rollers, and means substantially such as above described for feeding said rollers along said slide-box or slide-bar, substantially as, and for the purposes, hereinbefore described.

SAMUEL STANBRIDGE.

Witnesses:
JOHN T. KNOWLES,
ALEXANDER W. ALLEN.